United States Patent [19]
DeRees et al.

[11] Patent Number: 5,741,045
[45] Date of Patent: Apr. 21, 1998

[54] CAR BODY PART WITH HIDDEN BONDING SURFACE

[75] Inventors: Delbert D. DeRees, Romeo; Donald E. Jay, Troy, both of Mich.

[73] Assignee: Chrysler Corporation, Auburn Hills, Mich.

[21] Appl. No.: 886,839

[22] Filed: Jul. 1, 1997

Related U.S. Application Data

[63] Continuation of Ser. No. 545,062, Oct. 19, 1995, abandoned.

[51] Int. Cl.⁶ ............................................. B62D 25/00
[52] U.S. Cl. ...................... 296/203; 296/901; 52/735.1
[58] Field of Search ........................... 545/62; 296/70, 296/146.5, 146.6, 187, 191, 203, 205, 901; 52/730.4, 735.1; 264/572

[56] References Cited

U.S. PATENT DOCUMENTS

| | | |
|---|---|---|
| 872,031 | 11/1907 | Thomas et al. . |
| 1,220,999 | 3/1917 | Booth . |
| 1,953,515 | 4/1934 | Smith . |
| 2,148,950 | 2/1939 | Maier . |
| 2,197,644 | 4/1940 | Krogh ............................ 296/187 |
| 2,234,781 | 3/1941 | Schjolin . |
| 2,254,458 | 9/1941 | Swallow . |
| 2,306,416 | 12/1942 | Waterhouse, Jr. . |
| 2,362,077 | 11/1944 | Ledwinka et al. . |
| 2,380,031 | 7/1945 | Deisley et al. . |
| 2,383,029 | 8/1945 | Ulrich . |
| 2,637,592 | 5/1953 | Karlby . |
| 2,645,519 | 7/1953 | Stanfield et al. . |
| 2,656,214 | 10/1953 | Alamagny . |
| 2,678,231 | 5/1954 | Barenyi . |
| 2,687,325 | 8/1954 | Lindsay . |
| 2,693,982 | 11/1954 | Barenyi . |
| 2,700,570 | 1/1955 | Barenyi . |
| 2,700,571 | 1/1955 | Barenyi . |
| 2,710,770 | 6/1955 | Barenyi . |
| 2,723,154 | 11/1955 | Barenyi . |
| 2,733,096 | 1/1956 | Waterhouse et al. . |
| 2,797,952 | 7/1957 | Barenyi et al. . |
| 2,797,953 | 7/1957 | Barenyi . |
| 2,814,524 | 11/1957 | Porsche et al. . |
| 2,841,439 | 7/1958 | Schwenk . |
| 2,880,032 | 3/1959 | Barenyi . |
| 2,908,528 | 10/1959 | Richter . |
| 2,921,812 | 1/1960 | Barenyi . |
| 2,973,220 | 2/1961 | White . |
| 2,986,423 | 5/1961 | Barenyi . |
| 3,003,809 | 10/1961 | Barenyi . |
| 3,021,172 | 2/1962 | Fiala et al. . |
| 3,037,808 | 6/1962 | Barenyi . |
| 3,061,361 | 10/1962 | Barenyi . |
| 3,087,207 | 4/1963 | Styra ............................ 20/11 |
| 3,323,608 | 6/1967 | Eggert, Jr. . |

(List continued on next page.)

FOREIGN PATENT DOCUMENTS

| | | | |
|---|---|---|---|
| 173721 | 7/1988 | Japan | ..................... 296/901 |
| 4110280 | 4/1992 | Japan | ..................... 296/187 |
| 4-110280A | 10/1992 | Japan . | |
| 6056053 | 3/1994 | Japan | ..................... 296/187 |

*Primary Examiner*—Dennis H. Pedder
*Attorney, Agent, or Firm*—Jennifer M. Stec

[57] ABSTRACT

A first car body part to be bonded to a second car body part. The first car body part includes a sealing wall and a supplemental wall having a first side end and a second side end. The sealing wall has a bonding surface to be bonded to a surface of the second car body part. The supplemental wall joins the sealing wall at the first and second side ends forming a void between the sealing wall and the supplemental wall. The joined sealing wall and supplemental wall form a tubular member having a top end and a bottom end. The sealing wall, the bonding surface, the supplemental wall, and the void may be elongated. The first car body part may have a top capping wall and a bottom capping wall, the top capping wall sealing the top end of the tubular member and the bottom capping wall sealing the bottom end of the tubular member, thereby fully enclosing the void. The first car body part may be, e.g., a side body panel, a door interior trim panel, an instrument panel, or a hardware panel.

8 Claims, 2 Drawing Sheets

U.S. PATENT DOCUMENTS

| | | | |
|---|---|---|---|
| 3,331,627 | 7/1967 | Schroder et al. | |
| 3,338,617 | 8/1967 | Lockwood | 296/901 X |
| 3,415,568 | 12/1968 | Gugelot et al. | |
| 3,423,122 | 1/1969 | Wessells, III. | |
| 3,423,123 | 1/1969 | Wessells, III. | |
| 3,503,825 | 3/1970 | Moore | 156/245 |
| 3,541,192 | 11/1970 | Shapero et al. | 264/45 |
| 3,550,948 | 12/1970 | Thompson et al. | |
| 3,561,813 | 2/1971 | Barenyi et al. | |
| 4,205,872 | 6/1980 | Bollinger | 296/205 |
| 4,217,970 | 8/1980 | Chika | 180/298 |
| 4,382,626 | 5/1983 | Spooner. | |
| 4,521,049 | 6/1985 | Genma et al. | 296/185 |
| 4,555,134 | 11/1985 | Gruna | 296/189 |
| 4,682,809 | 7/1987 | Huss. | |
| 4,740,150 | 4/1988 | Sayer | 425/542 |
| 4,804,199 | 2/1989 | Picard | 280/33.998 |
| 4,842,326 | 6/1989 | DiVito | 296/196 |
| 4,865,378 | 9/1989 | Filtri et al. | 296/197 |
| 4,917,594 | 4/1990 | Gellert et al. | 425/549 |
| 4,940,282 | 7/1990 | Townsend | 296/204 |
| 4,945,682 | 8/1990 | Alman et al. | 49/502 |
| 4,990,083 | 2/1991 | Bernhardt | 425/547 |
| 5,002,309 | 3/1991 | Vecellio | 296/197 |
| 5,011,217 | 4/1991 | Simpson et al. | 296/203 |
| 5,054,689 | 10/1991 | Hunnerberg et al. | 239/412 |
| 5,094,313 | 3/1992 | Mauws | 180/210 |
| 5,098,637 | 3/1992 | Hendry | 264/572 |
| 5,100,187 | 3/1992 | Loren | 264/572 X |
| 5,198,238 | 3/1993 | Baxi | 425/130 |
| 5,302,337 | 4/1994 | Krajewski | 264/572 X |
| 5,314,230 | 5/1994 | Hutchison et al.. | 296/203 |
| 5,338,080 | 8/1994 | Janotik et al. | 296/29 |
| 5,387,391 | 2/1995 | Satoa et al. | 264/572 X |
| 5,403,647 | 4/1995 | Kaneishi et al. | 428/156 |

5,741,045

1

CAR BODY PART WITH HIDDEN BONDING SURFACE

This application is a continuation of application Ser. No. 08/545,062, filed Oct. 19, 1995, now abandoned.

BACKGROUND OF THE INVENTION

1. Field of the Invention

The present invention relates generally to car body parts having hidden bonding surfaces and, more particularly, to injection-molded car body parts having hidden bonding surfaces.

2. Description of the Related Art

In the automotive industry, the trend is toward lighter vehicles and, thus, toward forming more car body parts of lightweight plastic materials. Often, these plastic car body parts may be bonded together primarily using adhesive rather than, or in conjunction with, mechanical fasteners such as rivets. However, as has always been the case, the car body parts should be designed with optimum aesthetic appeal to be pleasing to the consumer.

To achieve optimum aesthetic appeal when bonding plastic car body parts together, it is desirable that the bonding surface be hidden and have the outward appearance of a smooth, rounded surface. In addition, the car body part should exhibit high stiffness and strength to withstand handling during assembly and normal operation of the car. Furthermore, the design of the car body part should render the part lightweight.

It is, therefore, one object of the present invention to provide a car body part having a hidden bonding surface.

It is another object of the present invention to provide a car body part which, when bonded to another car body part, presents smooth, rounded outward surfaces.

It is yet another object of the present invention to provide a car body part which exhibits high strength and stiffness.

It is still another object of the present invention to provide a car body part which has a designed-in weight-reduction feature.

SUMMARY OF THE INVENTION

To achieve the foregoing objects, the present invention is a first car body part to be bonded to a second car body part. The first car body part includes a sealing wall and a supplemental wall having a first side end and a second side end. The sealing wall has a bonding surface to be bonded to a surface of the second car body part. The supplemental wall joins the sealing wall at its first and second side ends forming a void between the sealing wall and the supplemental wall. The sealing wall, the bonding surface, the supplemental wall, and the void may be elongated.

The joined sealing and supplemental walls form a tubular member having a top end and a bottom end. The first car body part may have a top capping wall and a bottom capping wall, the top capping wall sealing the top end of the tubular member and the bottom capping wall sealing the bottom end of the tubular member, thereby fully enclosing the void.

The first car body part may be, e.g., a side body panel, a door interior trim panel, an instrument panel, or a hardware panel.

Other objects, features, and advantages of the present invention will be readily appreciated as the same becomes better understood after reading the subsequent description taken in conjunction with the appendant drawings.

DESCRIPTION OF THE PREFERRED EMBODIMENT(S)

Figure 1:
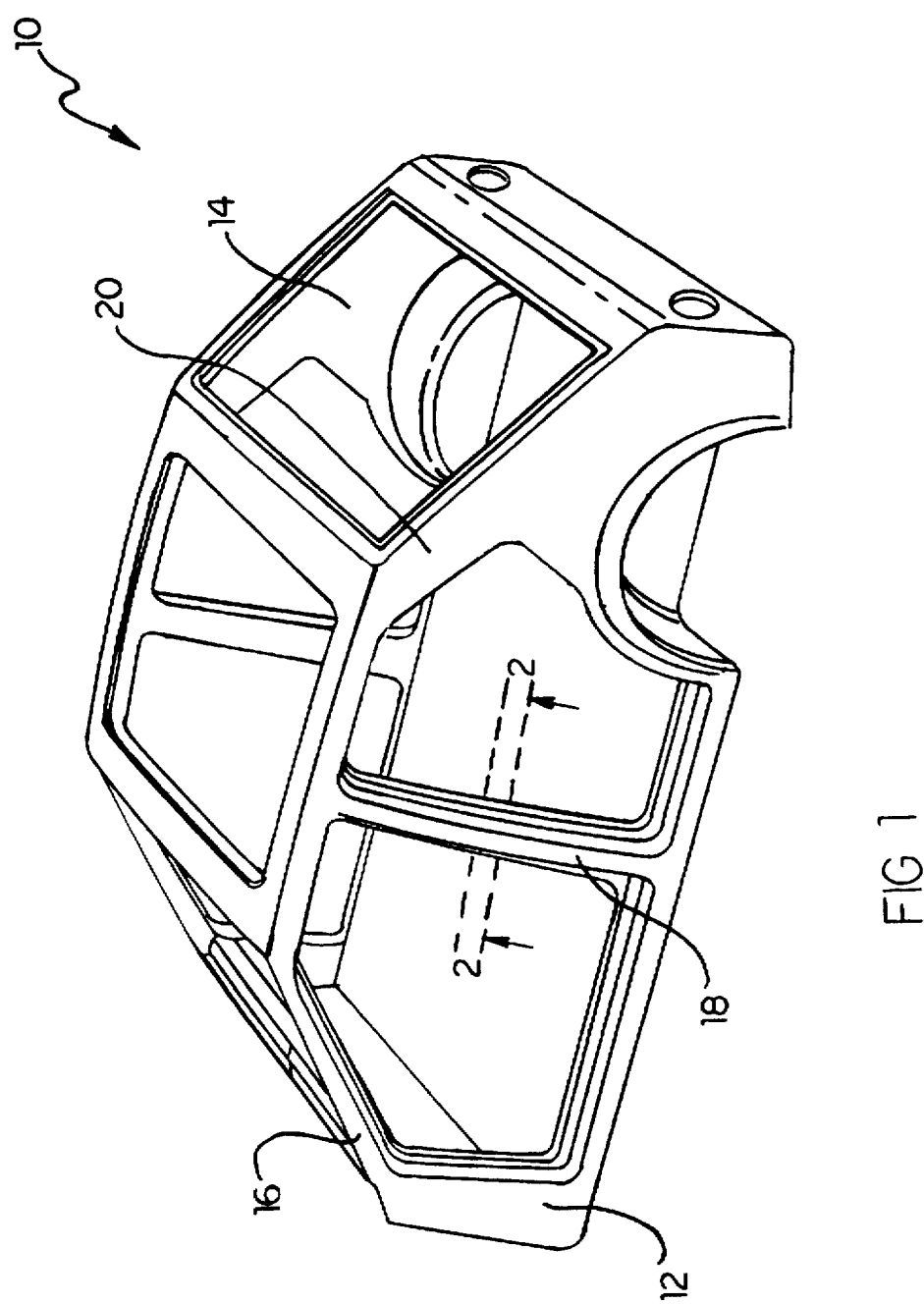
FIG. 1 is a perspective view of a car having a car body part formed according to the present invention.

Referring to the drawings, wherein like reference characters designate corresponding parts throughout the Figures thereof, FIG. 1 depicts a car body which is generally indicated by reference numeral 10. Car body 10 includes left-side body panel 12 and right-side body panel 14. Left-side body panel 12 has "A" pillar 16, "B" pillar 18, and "C" pillar 20. Similar to left-side body panel 12, right-side body panel 14 also has "A", "B", and "C" pillars.

Figure 2:
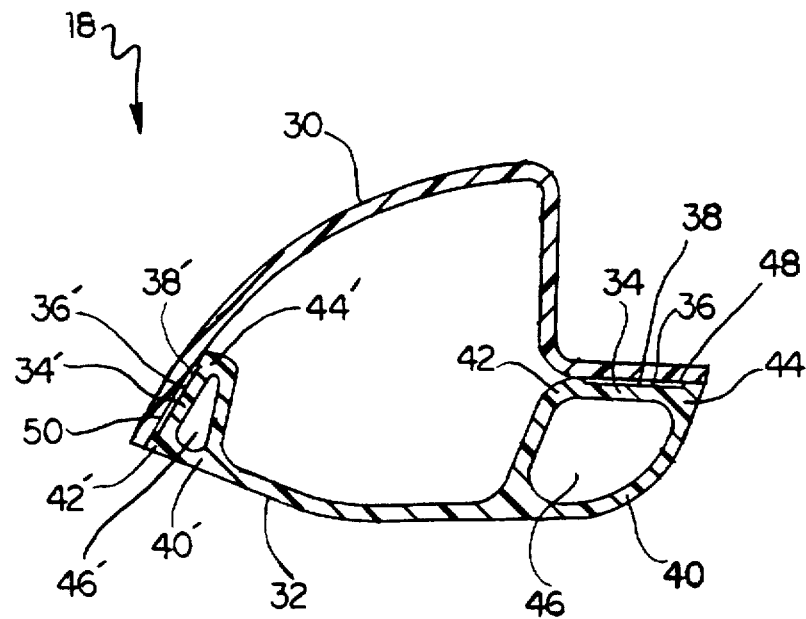
FIG. 2 is a sectional view of the slice defined between lines 2—2 of FIG. 1, the view taken in the direction of the arrows.

FIG. 2 shows a sectional view of the slice taken of "B" pillar 18 by lines 2—2 in FIG. 1, the view taken in the direction of the arrows. As shown in FIG. 2, "B" pillar 18 includes outer member 30 and inner member 32.

Inner member 32 represents a car body part of the present invention and outer member 30 represents a car body part to which inner member 32 is to be bonded. Inner member 32 includes sealing wall 34 having bonding surface 36 thereon. Bonding surface 36 has flat indentation 38 therein. Inner member 32 also includes supplemental wall 40 having first side end 42 and second side end 44. Supplemental wall 40 joins sealing wall 34 at first and second side ends 42 and 44, thus forming void 46 between sealing wall 34 and supplemental wall 40.

Inner member 32 also includes sealing wall 34' having bonding surface 36' thereon. Bonding surface 36' has flat indentation 38' therein. Outer member 30 also includes supplemental wall 40' having first side end 42' and second side end 44'. Supplemental wall 40' joins sealing wall 34' at first and second sides ends 42' and 44', thus forming void 46' between sealing wall 34' and supplemental wall 40'.

Outer member 30 has surfaces 48 and 50 thereon which are to be bonded to bonding surfaces 36 and 36' of inner member 32. The bonding is accomplished with an adhesive. The adhesive may be placed in indentations 38 and 38'. Indentations 38 and 38' provide ample room for the adhesive as well as provide a place for concealing the adhesive.

Figure 3:
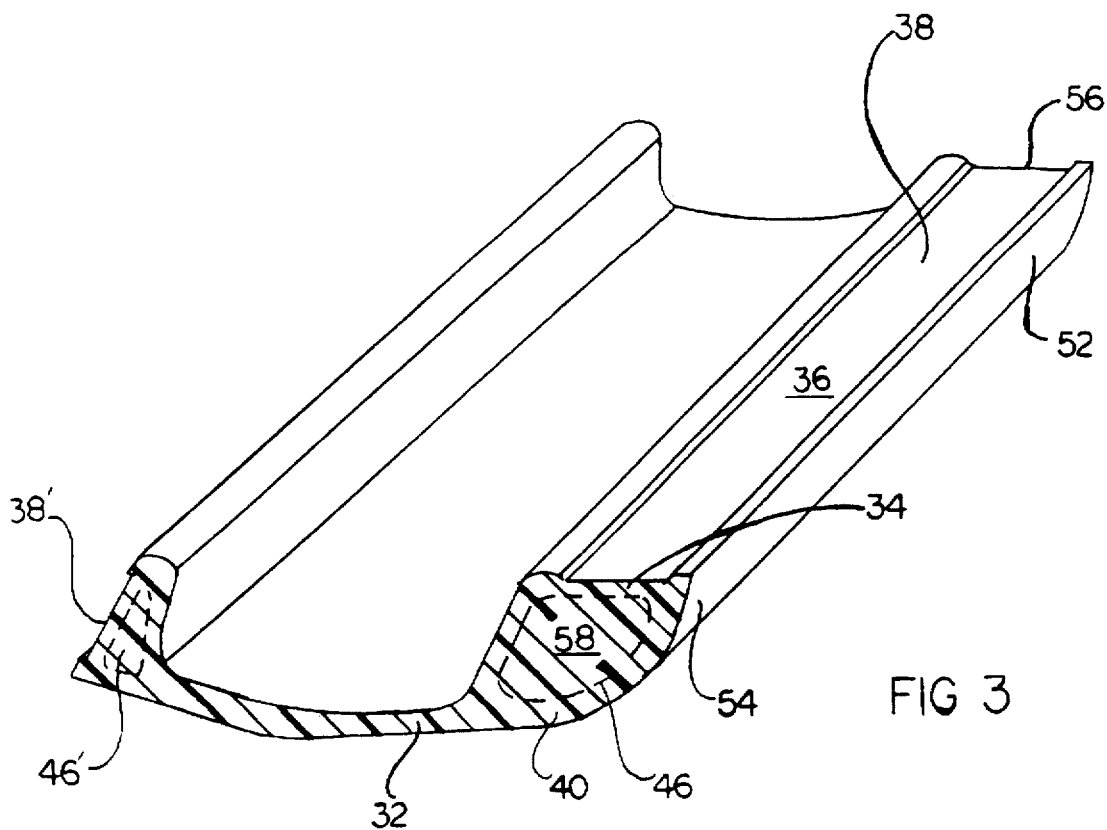
FIG. 3 is a sectional perspective view of a car body part presented in FIG. 2.

FIG. 3 illustrates a perspective view of an elongated sectional slice of inner member 32. Typically, in car body parts of the present invention, the sealing wall(s), the bonding surface(s), the supplemental wall(s), and the void(s) are elongated. FIG. 3 illustrates that joined sealing wall 34 and supplemental wall 40 forms a tubular member which has top end 52 and bottom end 54. As may be seen from FIG. 2, the tubular member does not have to have a circular transverse cross section as do most tubes. Rather, the tubular member may have a transverse cross section of any shape. Top end 52 is sealed with top capping wall 56, and bottom end 54 is sealed with bottom capping wall 58. Top and bottom capping walls 56 and 58 thereby seal or fully enclose void 46 (shown in phantom).

As can be seen in FIG. 2, the bonding surfaces between outer member 30 and inner member 32 are hidden, and the visible portions of the bonds are smooth and rounded, which adds to the aesthetic appeal of the car body. Previously, bonds between outer and inner members 30 and 32 would be formed between outer member 30 and sealing walls 34 and 34' of inner member 32. In other words, the supplemental walls were absent. Therefore, with the present invention, stiffness and strength are added to the bonding flanges due to the presence of supplemental walls 40 and 40'. With the additional stiffness and strength, a minimal amount of weight is added to the inner member because of the presence of voids 46 and 46', thereby minimizing the weight of the inner member.

In FIGS. 1–3, a car body part of the present invention is exemplified by left-side body panel 12 which has "B" pillar 18 which is a car body member having a hidden bonding surface. Other car body members which may have hidden bonding surfaces according to the present invention include "A" pillars and "C" pillars. In addition, other car body parts which may be formed according to the present invention include the right-side body panel, door interior trim panels, instrument panels, and hardware panels. A hardware panel is the panel which supports the lift mechanism for a side window of a car.

The car body parts of the present invention may be formed of plastic and may be formed by gas-assisted injection molding techniques in which plastic material is introduced into a mold space and melted and, at one or more selected positions in the mold or through the injection nozzle, a pressurized gas is introduced into the molten plastic material in the mold. The pressurized gas creates a gas-containing cavity in the plastic material which cavity remains even after the plastic material has hardened into a finished part. The gas-assisted injection molding methods also have the advantage of causing the plastic material to flow throughout the mold space completely and efficiently, thus producing a higher-quality part. Such methods are taught in U.S. Pat. Nos. 4,101,617, 4,740,150, 4,917,594, 4,990,083, 5,054,689, and 5,198,238 and Great Britain Pat. No. 2,139,548, which patents are incorporated herein by reference.

Accordingly, the present invention provides a car body part having a hidden bonding surface and which, when bonded to another car body part, presents a smooth, rounded bond flange. The present invention also provides a car body part which exhibits high strength and stiffness and has designed-in weight-reduction features. In addition, the present invention has the advantage that the car body part may be molded in a mold and obtain the mold's details to a high degree, thus, being a high-quality part.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An automotive body component assembly, comprising:
   a one-piece plastic inner panel having two spaced-apart longitudinal sealing walls, each said wall including a longitudinal bonding surface;
   a one-piece plastic outer panel bonded to the inner panel at the two bonding surfaces of the inner panel thereby forming two joints, the bonded inner and outer panels forming a longitudinal hollow region between the joints,
   the inner panel further having a supplemental wall corresponding to each sealing wall, each supplemental wall having a first side end and a second side end and being formed in one-piece with its corresponding sealing wall at its first and second side ends forming a longitudinal voided structure with a void between the sealing wall and its corresponding supplemental wall, the one-piece longitudinal voided structure having a top end and a bottom end,
   each longitudinal voided structure having a top capping wall being formed in one-piece with the sealing and supplemental walls and sealing the top end of the longitudinal voided structure and a bottom capping wall being formed as one-piece with the sealing and supplemental walls and sealing the bottom end of the longitudinal voided structure, thereby enclosing the void.

2. The first car body part of claim 1, wherein the sealing wall and the supplemental wall form a portion of a car body member selected from the group consisting of "A" pillars, "B" pillars, and "C" pillars.

3. The first car body part of claim 1, wherein the bonding surface has an indentation for receiving adhesive therein.

4. The first car body part of claim 1, wherein the bonding surface has an indentation for receiving adhesive therein, the indentation being generally flat.

5. A car pillar, comprising:
   a plastic inner pillar body part having two spaced-apart longitudinal sealing walls each having a longitudinal bonding surface;
   a plastic outer pillar body part bonded to the inner pillar body part at the two bonding surfaces of the inner pillar body part thereby forming two joints, the bonded inner and outer pillar body parts forming a longitudinal hollow region between the joints,
   the inner pillar body part further having supplemental wall corresponding to each sealing wall, each supplemental wall having a first side end and a second side end, a top capping wall, and a bottom capping wall,
   the inner pillar body part being formed by a gas-assisted injection molding technique such that (a) each supplemental wall is one-piece with its corresponding sealing wall at its first and second side ends forming a longitudinal voided structure with a void between the sealing wall and its corresponding supplemental wall, (b) the longitudinal voided structure having a top end and a bottom end, the longitudinal voided structures imparting strength at the joints and being aligned with the bonding surfaces of the outer pillar body part so that the outer surface of each joint is smooth, thereby forming hidden bonded joints, the top capping wall being one-piece with the sealing and supplemental walls and sealing the top end of the longitudinal voided structure, and (c) the bottom capping wall being one-piece with the sealing and supplemental walls and sealing the bottom end of the longitudinal voided structure, thereby enclosing the void.

6. The car pillar of claim 5, wherein the car pillar is selected from the group consisting of "A" pillars, "B" pillars, and "C" pillars.

7. The car pillar of claim 5, wherein the bonding surfaces of the inner pillar body part each have an indentation for receiving adhesive therein.

8. The car pillar of claim 5, wherein the bonding surfaces of the inner pillar body part each have an indentation for receiving adhesive therein, the indentations being generally flat.

* * * * *